(12) United States Patent
Walker et al.

(10) Patent No.: US 6,558,460 B1
(45) Date of Patent: May 6, 2003

(54) PIGMENTED INK JET INKS

(75) Inventors: Nicholas Alexander Walker, Goostrey (GB); Peter Edward Rose, Winsford (GB)

(73) Assignee: Ilford Imaging UK Limited (GB)

( * ) Notice: Subject to any disclaimer, the term of this patent is extended or adjusted under 35 U.S.C. 154(b) by 0 days.

(21) Appl. No.: 09/526,941

(22) Filed: Mar. 16, 2000

(30) Foreign Application Priority Data

Mar. 31, 1999 (GB) .............................................. 9907493

(51) Int. Cl.$^7$ ................................................ C09D 11/02
(52) U.S. Cl. ................................ 106/31.75; 106/31.86; 106/31.65
(58) Field of Search ........................... 106/31.75, 31.86, 106/31.65

(56) References Cited

U.S. PATENT DOCUMENTS

| | | |
|---|---|---|
| 4,311,775 A | 1/1982 | Regan |
| 5,026,427 A | 6/1991 | Mitchell et al. |
| 5,080,716 A * | 1/1992 | Aoki et al. ............... 106/31.43 |
| 5,085,698 A | 2/1992 | Ma et al. |
| 5,172,133 A | 12/1992 | Suga et al. |
| 5,268,027 A | 12/1993 | Chan et al. |
| 5,651,813 A | 7/1997 | Santilli et al. |
| 5,788,750 A * | 8/1998 | Gundlach et al. ........ 106/31.27 |
| 5,821,283 A | 10/1998 | Hesler et al. |
| 5,833,744 A * | 11/1998 | Breton et al. ............ 106/31.59 |
| 5,837,044 A | 11/1998 | Santilli et al. |
| 5,897,695 A * | 4/1999 | Mayo et al. ............. 106/31.75 |
| 5,948,237 A | 9/1999 | Miller et al. |
| 5,985,017 A | 11/1999 | Bugner et al. |
| H1828 H * | 1/2000 | Wong et al. ................ 523/161 |
| 6,123,758 A | 9/2000 | Colt |

OTHER PUBLICATIONS

*Colour Index International Pigments and Solvent Dyes* The society of Dyers and Colourists (1997) England; "Pigments" pp1–197, no month available.

* cited by examiner

Primary Examiner—Mark L. Bell
Assistant Examiner—Veronica F. Faison
(74) Attorney, Agent, or Firm—Onofrio Law; Dara L. Onofrio, Esq.

(57) ABSTRACT

A pigmented aqueous ink jet ink composition is provided which comprises a sarcosinate compound of the formula:

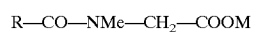

R—CO—NMe—CH$_2$—COOM

In which R is a ballasting group comprising at least ten carbon atoms and M is hydrogen, an alkali metal cation, an ammonium cation or a substituted ammonium cation.

Preferably the ink is prepared by dispersing the pigment in the presence of the sarcosinate compound in water, together with optional co-solvents or other components, and then diluting this dispersion to form the ink.

18 Claims, No Drawings

PIGMENTED INK JET INKS

FIELD OF THE INVENTION

This invention relates to aqueous pigmented inks for use in ink jet printers.

BACKGROUND OF THE INVENTION

Ink jet printing is a non-impact method that in response to a digital signal produces droplets of ink that are deposited on a substrate such as paper or transparent film. Ink jet printing has found broad application for output for personal computers in the office and the home as well as in industry. There are several classes of ink jet printer, for instance thermal drop-on-demand printers, piezo drop-on-demand printers, and continuous ink jet printers.

Ink jet printers, particularly those for use in the home or office, generally use aqueous inks, and such inks commonly employ dyes as colorants. However the use of dyes introduces certain disadvantages, particularly the problems of poor light stability and poor fastness to washing and weathering of the prints produced. It is expected that these disadvantages can be overcome by the use of pigments as colorants in ink jet inks, and there is therefore considerable interest in such pigmented inks. The term pigment describes a colorant which is essentially insoluble in the aqueous ink medium. Various classes of pigment are catalogued and classified in the Pigments and Solvent Dyes section of the Colour Index International, published by the Society of Dyers and Colorists in 1997. Many pigments described by the Colour Index are suitable for ink jet use, together with certain compounds classified by the Colour Index as vat or disperse dyes as well as numerous other insoluble coloured compounds which are not included in the Colour Index such as, for example, the cyan pigments described in U.S. Pat. No. 4,311,775 to Regan.

Pigments need to be finely dispersed for use in inks, and this requirement is particularly important for use in jetting inks because of the fine nozzles used in ink jet printers. It is common to formulate dispersions of pigments for use in jetting inks by first dispersing the pigment in a suitable medium, frequently water, in the presence of one or more stabilizers to stabilize and disperse the fine particles, and then letting this dispersion down into the ink with more water, together with organic co-solvents and other additives. The stabilizer used in the dispersion is commonly known as a dispersant or surfactant, and the choice of this component is of crucial importance to the performance of the ink.

It is well known that the choice of dispersant will affect the particle size achieved during the dispersing operation as well as the ease of dispersion. It is also well known that the properties of the ink greatly depend on the stability of the dispersed particles, and the stabilization system is of crucial importance in achieving this. For example, it can be found that particles which are well stabilized in a concentrated dispersion lose this stability when let down into an ink, and that the particles in the ink flocculate or aggregate on storage. This can sometimes be due to simple dilution of the stabilizer, but can also result from interactions with the organic co-solvents or other additives which are commonly present in the final ink. However these co-solvents and other additives need to be present in the ink, either for it to be used successfully in an ink jet printer or to give acceptable properties to the final image. For instance, a major concern with all ink jet printing devices is pluggage of nozzles during operation and between operations, and it is common to add around 10 to 25% of a relatively involatile organic co-solvent or mixture of co-solvents to an aqueous ink to overcome this. Various simple aliphatic polyols, such as glycerol, ethylene glycol, propylene glycol, and diethylene glycol are known to be useful for this purpose. In addition, certain water soluble polymers are also known to be useful, generally in combination with low molecular weight organic cosolvents, and for instance U.S. Pat. No. 5,268,027 to Chan et al. describes the use of alkyl bis polyol ethers as pluggage inhibitors for dyed ink jet inks. However the presence of these additives can adversely affect the dispersion stability of pigmented inks.

It is also known that physical properties of an ink such as surface tension and viscosity which are important for achieving good jettability through an ink jet printer can also depend on the dispersant used in pigmented inks, as can kogation of the heating element for thermal printers. Finally such properties of the final image as density, sharpness, and smudge resistance also depend on the dispersant used.

Several dispersants useful for pigmented aqueous inks are already known. Those most commonly described are acrylic resins which comprise various copolymers of acrylic, methacrylic, or maleic acids, generally in combination with other vinylically unsaturated monomers such as styrene or acrylic esters, such as those described in U.S. Pat. No. 5,085,698 to Ma et al.; U.S. Pat. No. 5,172,133 to Suga et al. and U.S. Pat. No. 5,821,283 to Hesler et al. However with dispersants of this type it can be difficult to achieve the necessary ink stability in the presence of other additives and also to achieve the required viscosity and surface tension without adversely affecting the stability. Various ethoxylated surfactants such as alkyl phenol ethoxylates and alkyl ethoxylates have been described, for example in U.S. Pat. No. 5,837,044 to Santilli et al., but nozzle clogging with pigmented inks can be a problem with this type of dispersant. Simple surfactants, for example sodium dodecyl sulphate and sodium N-methyl-N-oleyl taurate as described in U.S. Pat. No. 5,651,813 to Santilli et al. are also known as dispersants in pigmented jetting inks.

However a need still exists for inks which are highly stable towards aggregation or flocculation on storage, which print successfully through an ink jet printer, and which give good properties to the final image, without introducing other disadvantages. We have found that pigmented ink compositions formulated using various sarcosinate compounds are particularly suitable for ink jet use.

SUMMARY OF THE INVENTION

The invention relates to a pigmented aqueous ink jet ink composition which comprises a sarcosinate compound of the formula:

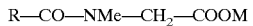

R—CO—NMe—CH$_2$—COOM

In which R is a ballasting group comprising at least ten carbon atoms and M is hydrogen, an alkali metal cation, an ammonium cation or a substituted ammonium cation.

Sarcosinate compounds are well known, and a variety of such compounds are commercially available. They may be prepared from sarcosine, which is an amino acid of natural origin, by acylation with a suitable acylating agent such as an acid chloride of the formula R—COCl.

Particularly useful sarcosinate compounds are those in which the group R consists of an alkyl chain of between eleven and eighteen atoms. Other useful compounds are those in which the group R consists of an unsaturated alkyl group. It is to be understood that the group R may consist of mixtures of chain lengths or of different isomers in commercially available sarcosinate compounds.

Suitable alkali metal cations include sodium and potassium cations, and suitable substituted ammonium cations include ethanolammonium and triethanolammonium cations.

Specific examples of useful sarcosinate compounds which are commercially available include N-lauroyl sarcosine, N-cocoyl sarcosine, N-stearoyl sarcosine, Sodium N-lauroyl sarcosinate, Potassium N-lauroyl. sarcosinate, Sodium N-palmitoyl sarcosinate, Sodium N-myristoyl sarcosinate, Triethanolammonium N-lauroyl sarcosinate, Triethanolammonium Palm Kernel sarcosinate and Sodium N-oleyl sarcosinate. The oleyl group is an unsaturated alkyl group R and the cocoyl group is one in which the group R comprises a mixture of chain lengths.

DETAILED DESCRIPTION OF THE INVENTION

The invention relates to pigmented ink jet ink compositions which are particularly suited for use in ink jet printers in general, and thermal ink jet printers in particular. The pigmented inks comprise an aqueous carrier medium, a pigment, and a sarcosinate compound, together with other components which are advantageously added to aqueous inks, such as surfactants, viscosity modifiers, and biocides. In addition, sequestering agents such as EDTA may also be included to eliminate deleterious effects of heavy metal impurities.

Specific examples of pigments for a black ink include carbon black (C.I. Pigment Black 7), such as furnace black, lamp black, acetylene black, and channel black, and o-nitroaniline black (C.I. Pigment Black 1), of which carbon black is preferred. Specific examples of the pigment for a coloured ink include C.I.Pigment Yellow 1, 3, 12, 13, 14, 17, 24, 34, 35, 37, 53, 55, 74, 81, 83, 93, 95, 97, 98, 100, 101, 104, 108, 109, 110, 117, 120, 128, 138, 151, 153, 154, 155, 180, and 185, C.I. Pigment Orange 5, 13, 16, 17, 34, 36, 43, 51, 70, and 71, C.I. Pigment Red 1, 2, 3, 9, 17, 22, 23, 31, 38, 48:1, 48:2, 48:3, 48:4, 49:1, 52:2, 53:1, 60:1, 63:1, 63:2, 64:1, 81, 83, 88, 104, 105, 106, 112, 114, 122, 123, 146, 149, 166, 168, 170, 172, 177, 178, 179, 184, 188, 190, 193, 202, 209, and 219, C.I. Pigment Violet 1, 3, 5:1, 16, 19, 23, and 38, C.I. Pigment Blue 1, 2, 15:1, 15:2, 15:3, 15:4, 15:6, 16, 17:1, 56, 60, and 63, and C.I. Pigment Green 1, 4, 7, 8, 10, 17, 18, and 36. Preferred examples of pigments for a coloured ink include Pigment Yellow 13, 74, 128, 151, 154, 155, and 180, Pigment Orange 34, 43, and 71, Pigment Red 122, 202, and 209, Pigment Violet 19, Pigment Blue 15:3, 15:4, and 16, and Pigment Green 7. It is also possible to mix more than one pigment in the inks of the invention.

Many of the above pigments are available commercially in finely divided forms which are specifically aimed at ink jet use. It is preferred to use such available forms in the inks of this invention. It is also possible to use processed pigments such as a graft carbon having a surface treatment.

The sarcosinate compounds are particularly useful as dispersants for pigmented ink jet inks. Therefore according to this preferred aspect of the invention, the ink is prepared by dispersing the pigment or predispersed pigment in the presence of the sarcosinate compound in water, together with optional co-solvents or other components, and then diluting this dispersion to form the ink. The dispersing step may be accomplished using one of several well known techniques, for example in a horizontal mini mill, a ball mill, an attritor, or by passing the mixture through a plurality of nozzles within a liquid jet interaction chamber at a liquid pressure of at least 1000 psi as described in U.S. Pat. No. 5,026,427 to produce a uniform dispersion of the pigment particles. By dilution, the ink is adjusted to the desired viscosity, colour, hue, saturation density, and print area coverage for the particular application.

The particle diameter of the pigment is preferably 10 $\mu$m or less, particularly preferably 1 $\mu$m or less.

The ink may contain up to approximately 30% pigment by weight, but will generally be in the range of approximately 0.1 to 15%, and is preferably approximately 1 to 8%, by weight of the total ink composition for most thermal ink jet printing applications.

The ink may contain up to 30% of a Sarcosinate compound, but preferably between 0.1% and 10%, and most preferably between about 0.5% and about 2% by weight, depending on the pigment used and other properties desired of the ink.

The aqueous carrier medium is water or a mixture of water and at least one water soluble organic solvent. Deionized water is commonly used. Preferably the aqueous carrier medium is a mixture of water and at least one water soluble organic solvent and most preferably a mixture of water with more than one water soluble organic solvent. Selection of a suitable mixture of water and water soluble organic solvent depends on the requirements of the specific application, such as the selected pigment, the desired surface tension and viscosity, the drying time of the pigmented ink jet ink, and the type of substrate onto which the ink will be printed.

Representative examples of water-soluble organic solvents that may be selected include:
(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;
(2) ketones or ketoalcohols such as acetone, methyl ethyl ketone and diacetone alcohol;
(3) ethers, such as tetrahydrofuran and dioxane;
(4) esters, such as ethyl lactate;
(5) polyhydric alcohols, such as ethylene glycol, diethylene glycol, triethylene glycol, propylene glycol, tetraethylene glycol, polyethylene glycol, glycerol, 2-methyl-2, 4-pentanediol, 1,5-pentanediol, 1,2-hexanediol, 1,2,6-hexanetriol and thiodiglycol;
(6) lower alkyl mono-or di-ethers derived from alkylene glycols, such as ethylene glycol monomethyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether;
(7) nitrogen containing organic compounds such as urea, pyrrolidone, N-methyl-2-pyrrolidone, and 1,3-dimethyl-2-imidazolidinone; and
(8) sulphur-containing compounds such as dimethyl sulphoxide and tetramethylene sulfone.

A preferred aqueous carrier medium is a mixture of water and at least one polyhydric alcohol such as diethylene glycol. Another preferred aqueous carrier medium is a mixture of water with at least one polyhydric alcohol together with at least one water soluble nitrogen containing compound such as urea or pyrrolidone. The aqueous composition may contain up to 50% of the organic cosolvent or cosolvents, but preferably up to about 10% of each of a mixture of organic cosolvents, and most preferably between about 5% and about 10% of each of a mixture of organic cosolvents.

The following examples will serve to illustrate the invention:

EXAMPLE 1

A series of magenta inks was prepared as follows:

Ink 1 (Invention)

Pigment Dispersion

Ten grams (10 g) of a commercially available finely divided form of the magenta pigment Pigment Red 122 was mixed using a Silverson rotor stator mixer with 30 g of a 10% solution of Sodium N-lauroyl sarcosinate (available from Croda Colloids) and 60 g of deionised water.

The resultant mixture was then passed through a Microfluidiser Model 110-F at 12000 PSI to produce a pigment dispersion. The dispersion was then centrifuged at 3000 rpm for 20 minutes to remove oversized particles. The average particle size of the resulting dispersion was less than 200 nm.

Ink Formulation

A magenta ink was then prepared from this dispersion according to the formulation given in TABLE 1.

TABLE 1

| Component | Amount (grams) Parts by Weight |
|---|---|
| Pigment Dispersion | 35.00 |
| Thiodiglycol | 10.00 |
| Urea | 5.00 |
| Poly Ethylene Glycol MW300 | 10.00 |
| Deionised Water | 40.00 |

Ink 2 (Comparison)

A magenta pigment dispersion was prepared in the same manner as in example 1, using 10g of the same magenta pigment but dispersing with 3 g of a commercially available aromatic ethoxylate dispersant (available from Zeneca). The ink was formulated from this dispersion using the components as described in TABLE 1.

Ink 3 (Comparison)

A magenta pigment dispersion was prepared in the same manner as in example 1, using 10 g of the same magenta pigment but dispersing with 17 g of a block copolymer resin dispersant (commercially available from Byk Chemie). The ink from this dispersion was formulated with the components described in TABLE 1.

Ink 4 (Comparison)

A magenta pigment dispersion was prepared in the same manner as in example 1, using 10 g of the same magenta pigment but dispersing with 3 g of a commercially available nonionic/anionic blend dispersant based on 2,4,7,9,-tetramethyl-5-decyne4,7-diol acetylenic surfactant blend (available from Air Products). The ink from this dispersion was formulated with the components described in TABLE 1.

Ink 5 (Comparison)

A magenta pigment dispersion was prepared in the same manner as in example 1, using 10 g of the same magenta pigment but dispersing with 30 g of a 10% solution of poly(ethylene oxide) (n=20) cetyl ether in deionised water. (See U.S. Pat. No. 5,837,044) The ink from this dispersion was formulated with the components described in TABLE 1.

The five inks were tested in the following manner:

Ink Stability Test

Five grams (5 g) of each ink formulation was placed into small sealed tube and then stored in a water bath at 70° C. The inks were inspected regularly for evidence of flocculation, settling, and instability. The test is an indication of long term ink stability. The time before any evidence of instability was seen was recorded.

Decap Test

Twenty grams (20 g) of each ink was loaded into an HP51626a print cartridge and loaded into an HP DJ400 printer. Several test patterns were printed which contained solid 100% colour blocks. The cartridge was then removed from the printer and left uncapped for 7 days. The test cartridge was then re-loaded into the printer and the solid 100% colour block test pattern printed again. An ink with good decap properites would start printing immediately, a bad ink would not print at all or only a proportion of the nozzles would fire.

The results of these tests are shown in TABLE 2.

TABLE 2

| FORMULATION | INK STABILITY at 70° C. | DECAP PERFORMANCE |
|---|---|---|
| INK 1 (invention) | 7 days | Excellent |
| INK 2 (comparison) | 4 days | Bad |
| INK 3 (comparison) | 7 days | Bad |
| INK 4 (comparison) | 7 days | Bad |
| INK 5 (comparison) | 7 days | Bad |

It will be seen that the inventive Ink 1 shows excellent ink decap performance and good stability. The comparative inks show poor decap performance, and Ink 2 also shows unacceptable ink stability. All inks gave acceptable image quality when printed.

EXAMPLE 2

Two yellow inks were prepared as follows:

Ink 1 (invention)

A yellow pigment dispersion was prepared in the same manner as described in Example 1, using 10 g of a finely divided commercially available form of Pigment Yellow 155 and 20 g of a 10% solution of Sodium N-lauroyl sarcosinate (available from Croda Colloids) in 70 g of deionised water. The ink was prepared from this dispersion by dilution with the components listed in TABLE 1.

Ink 2 (comparison)

A yellow pigment dispersion was prepared in the same manner as described in EXAMPLE 1, using 10 g of the same sample of Pigment Yellow 155 and 3 g of the acetylenic surfactant blend used for Ink 4 of Example 1 in 87 g of deionised water. The ink was formulated from this dispersion by diluting with the components listed in TABLE 1.

The two inks were tested as in EXAMPLE 1, and the results are shown in TABLE 3.

TABLE 3

| Formulation | Ink Stability at 70° C. | Decap Perfomance |
|---|---|---|
| Ink 1 (invention) | 7 days | Very Good |
| Ink 2 (comparison) | 7 days | Bad |

It will be seen that the inventive Ink 1 gave acceptable performance while the comparison Ink 2 showed unacceptable performance. Both inks gave acceptable images on printing.

What is claimed is:

1. A pigmented aqueous ink jet ink composition which comprises at least one sarcosinate compound of the formula:

R—CO—NMe—CH$_2$—COOM in which R is a ballasting group comprising at least ten carbon atoms and M is hydrogen, an alkali metal cation, an ammonium cation or a substituted ammonium cation; wherein said ammonium cation in said sarcosinate compound is selected from the group consisting of ethanol ammonium and triethanol ammonium cations.

2. A pigmented aqueous ink composition according to claim 1 in which the group R consists of an alkyl chain of between eleven and eighteen atoms.

3. A pigmented aqueous ink composition according to claim 1 in which the sarcosine compound is selected from the group consisting of N-lauroyl sarcosine, N-cocoyl sarcosine, N-stearoyl sarcosine, sodium N-lauroyl sarcosinate, potassium N-lauroyl sarcosinate, sodium N-palmitoyl sarcosinate, sodium N-myristoyl sarcosinate, triethanolammonium N-lauroyl sarcosinate, triethanolammonium palm kernel sarcosinate and sodium N-oleyl sarcosinate.

4. A method of preparing a pigmented aqueous ink jet ink composition which involves dispersing a pigment in water in the presence of at least one sarcosinate compound of the formula:

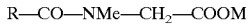

R—CO—NMe—CH$_2$—COOM in which R is a ballasting group comprising at least ten carbon atoms and M is hydrogen, an alkali metal cation, an ammonium cation or a substituted ammonium cation, and then diluting this dispersion to produce the ink; wherein said ammonium cation in said sarcosinate compound is selected from the group consisting of ethanol ammonium and triethanol ammonium cations.

5. An ink composition comprising: up to 30 wt. % pigment; up to 30 wt. % of a sarcosinate compound of the formula:

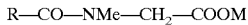

R—CO—NMe—CH$_2$—COOM in which R is a ballasting group comprising at least ten carbon atoms and M is hydrogen, an alkali metal cation, an ammonium cation or a substituted ammonium cation; and an aqueous carrier medium; wherein said ammonium cation in said sarcosinate compound is selected from the group consisting of ethanol ammonium and triethanol ammonium cations.

6. The ink composition according to claim 5 wherein said aqueous carrier medium is selected from the group consisting of water, water soluble organic solvents and mixtures thereof.

7. The ink composition according to claim 5 wherein said alkali metal cation in said sarcosinate compound is sodium or potassium.

8. The ink composition according to claim 5 wherein said R group in said sarcosinate compound is an unsaturated alkyl group.

9. The ink composition according to claim 5, wherein said sarcosinate compound is selected from the group consisting of N-lauroyl sarcosine, N-cocoyl sarcosine, N-stearoyl sarcosine, sodium N-lauroyl sarcosinate, potassium N-lauroyl sarcosinate, sodium N-palmitoyl sarcosinate, sodium N-myristoyl sarcosinate, triethanolammonium N-lauroyl sarcosinate, triethanolammonium palm kernel sarcosinate and sodium N-oleyl sarcosinate.

10. The ink composition according to claim 5, wherein the particle diameter of said pigment is 10 $\mu$m or less.

11. The ink composition according to claim 5, wherein said pigment is present in amounts in the range of 0.1 to 15 wt. % and said sarcosinate compound is present in amounts in the range of 0.1 to 10 wt. %.

12. The ink composition according to claim 6, wherein said water soluble organic solvent is selected from the group consisting of alcohols, methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones, ketoalcohols, acetone, methyl ethyl ketone and diacetone alcohol; ethers, tetrahydrofuran and dioxane; esters, ethyl lactate; polyhydric alcohols, ethylene glycol, diethylene glycol, triethylene glycol, propylene glycol, tetraethylene glycol, polyethylene glycol, glycerol, 2-methyl-2,4-pentanediol, 1,5-pentanediol, 1,2-hexanediol, 1,2,6-hexanetriol and thiodiglycol; lower alkyl mono-or di-ethers derived from alkylene glycols, ethylene glycol monomethyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; nitrogen containing organic compounds, urea, pyrrolidone, N-methyl-2-pyrrolidone, and 1,3-dimethyl-2-imidazolidinone; and sulphur-containing compounds, dimethyl sulphoxide and tetramethylene sulfone.

13. The ink composition according to claim 5 wherein said aqueous carrier medium is a mixture of water and at least one polyhydric alcohol.

14. The ink composition according to claim 13 wherein said polyhydric alcohol is selected from the group consisting of glycerol, glycol and thiodiglycol.

15. The ink composition according to claim 5 wherein said aqueous carrier medium is a mixture of water, at least one polyhydric alcohol and at least one water soluble nitrogen containing compound.

16. The ink composition according to claim 15 wherein said polyhydric alcohol is selected from the group consisting of glycerol, diethylene glycol and thiodiglycol; and said water soluble nitrogen containing compound is either urea or pyrrolidone.

17. The ink composition according to claim 5 wherein said aqueous carrier medium contains up to 50% of at least one organic solvent or co-solvents.

18. A pigmented aqueous ink composition comprising a sarcosine compound selected from the group consisting of N-lauroyl sarcosine, N-cocoyl sarcosine, N-stearoyl sarcosine, sodium N-lauroyl sarcosinate, potassium N-lauroyl sarcosinate, sodium N-palmitoyl sarcosinate, sodium N-myristoyl sarcosinate, triethanolammonium N-lauroyl sarcosinate, triethanolammonium palm kernel sarcosinate and sodium N-oleyl sarcosinate.

* * * * *